United States Patent [19]  
Kah, Jr.

[11] Patent Number: 4,987,917  
[45] Date of Patent: Jan. 29, 1991

[54] CONTROLLER SYNCHRONIZATION TO A SEQUENCING DISTRIBUTING VALVE

[76] Inventor: Carl L. C. Kah, Jr., 778 Lakeside Dr., N. Palm Beach, Fla. 33408

[21] Appl. No.: 378,015

[22] Filed: Jul. 11, 1989

[51] Int. Cl.[5] ............ F16K 11/04; F16K 31/163
[52] U.S. Cl. ................................. 137/119; 137/555; 137/624.2
[58] Field of Search ............ 137/119, 624.2, 624.18, 137/554, 555

[56] References Cited

U.S. PATENT DOCUMENTS

| | | | |
|---|---|---|---|
| 1,753,240 | 4/1930 | Howell et al. | 137/119 |
| 3,785,391 | 1/1974 | Miller | 137/119 |
| 4,101,786 | 7/1978 | Ruggles et al. | 137/624.2 X |
| 4,121,114 | 10/1978 | Ruggles | 137/624.2 X |
| 4,125,124 | 11/1978 | Kah | 137/119 |
| 4,146,054 | 3/1979 | Kah | 137/624.2 X |
| 4,270,573 | 6/1981 | Sturman et al. | 137/624.2 |

Primary Examiner—Stephen M. Hepperle  
Attorney, Agent, or Firm—Jack N. McCarthy

[57] ABSTRACT

A basic controller concept is disclosed for a sequencing distributing valve having a series of multiple outlets and a control timer to direct a like series of timed output signals thereto which allows the sequencing distributing valve to be rapidly pressure cycled to a desired outlet with synchronization between the sequencing distributing valve and control timer being established by a first pressure sensor for sensing cycling pressure and a second pressure sensor for sensing a pressure from a selected outlet of the sequencing valve. Continuing synchronization during cycling is provided by the valve housing pressure sensor which can advance the control timer each time the housing pressure of the sequencing distributing valve indicates that the sequencing distributing valve has cycled.

32 Claims, 6 Drawing Sheets

CONTROLLER SYNCHRONIZATION TO A SEQUENCING DISTRIBUTING VALVE

BACKGROUND ART

In my prior U.S. Pat. No. 4,146,054, I disclosed a method and apparatus for periodically automatically precisely positioning the valving means of a sequencing distributing valve, such as shown in my U.S. Pat. No. 4,125,124, to that of a control timer's time dial with its sequence of desired zone times such that each of the sequencing distributing valve outlets flow for the desired zone running times as programmed on the control timer's time dial.

With the new electronic timing circuits, it may be desired to reset the electronic circuit of the control timer rather than to reposition the valving means of the sequencing distributing valve as previously provided for.

SUMMARY OF INVENTION

In the arrangement disclosed herein, a pressure switch is attached to an outlet of the sequencing distributing valve to designate a first station that it is desired to run. This can be done without the necessity of disassembling the sequencing distributing valve by only having to drill and install a pressure tap on the desired outlet. This installation can be applied to any manufacturer's sequencing distributing valve.

The outlet "one" reset pressure sensing switch contacts are closed by the switch being pressurized when the flow of the sequencing distributing valve is directed out of its outlet "one". This then provides a synchronizing signal to the control timer to reset its timing sequence.

Another important feature disclosed is that of also using a pressure sensing switch to sense the pressure in the sequencing distributing valve housing as an indication of when the sequencing distributing valve is sequenced "OFF" and back "ON" and sending that signal to the control timer. This signal can be used to advance the timing sequence of the electronic controller any time the valve housing pressure indicates that it has caused the sequencing distributing valve to have been sequenced.

Monitoring the cycling pressure of the sequencing distributing valve also provides the added feature of allowing the sequencing distributing valve to be rapidly cycled. Measurement of the pressure in the sequencing distributing valve allows the "ON-OFF" cycling of the sequencing distributing valve by the control timer to progress at whatever speed is allowed by the hydraulic characteristics of the system rather than being excessively long as would be required by a fixed timer delay in order to insure that there is time for the pressure in the sequencing distributing valve to have fallen off to permit cycling.

Thus once the sequencing distributing valve and control timer sequence are synchronized by the reset pressure signal for outlet "one", then any further pressure sequences that occur at the sequencing distributing valve, which the control timer had not signaled for, will advance the control timer's timing sequence to match the new position of the sequencing distributing valve and properly indicate its present position. An example of this would be a water surge from a pump causing the water supply to the sequencing distributing valve to stop and start again with sufficient amplitude and duration to cycle the sequencing distributing valve. Thus, the controller's timing sequence continues to be tied to the sequencing distributing valve's selected outlet position throughout the timing sequence.

If it is desired to cycle the sequencing distributing valve to find outlet "one" to match it to the first station time of the control timer, then the housing cycle pressure measurement of the sequencing distributing valve can be used to rapidly cycle the flow to the sequencing distributing valve, "OFF" and "ON", until the outlet "one" pressure signal is sensed, at which time the outlet "one" pressure signal can be used in one of the disclosed circuits to stop the "ON-OFF" cycling and continue to run outlet "one" for the desired time. Other sources of sequencing distributing valve cycling and position reference can be used with the circuits that are shown.

It is an object of this invention to provide an easy, reliable means of resetting a control timer's timing sequence to the outlet flow sequence of a sequencing distributing valve.

It is a further object to make the resetting means easily installable so that it can be attached to any sequencing distributing valve in the field.

Still a further object of this invention is to allow the installer to select which outlet of the sequencing distributing valve is to be the first outlet to be sequenced.

Another object of this invention is to provide a sequencing distributing valve cycle sensing signal which can be used to rapidly cycle the sequencing distributing valve and sense that the sequencing distributing valve has cycled.

Another object of the invention is to provide a simple circuit for reset which uses only the cycle pressure sensor of the sequencing distributing valve and the reset pressure sensor on the designated first outlet to be able to rapidly cycle the sequencing distributing valve to the designated first outlet and remain there for the desired timing.

Still another object is to provide a simple means that allows the controller to reliably indicate which station the sequencing distributing valve is on.

A further object of the invention is to provide a simple way of providing the required cycle delay timing of the sequencing distributing valve and prevent a water source from being turned back "ON" again until the sequencing distributing valve has cycled.

DESCRIPTION OF THE PREFERRED EMBODIMENT

Figure 1:
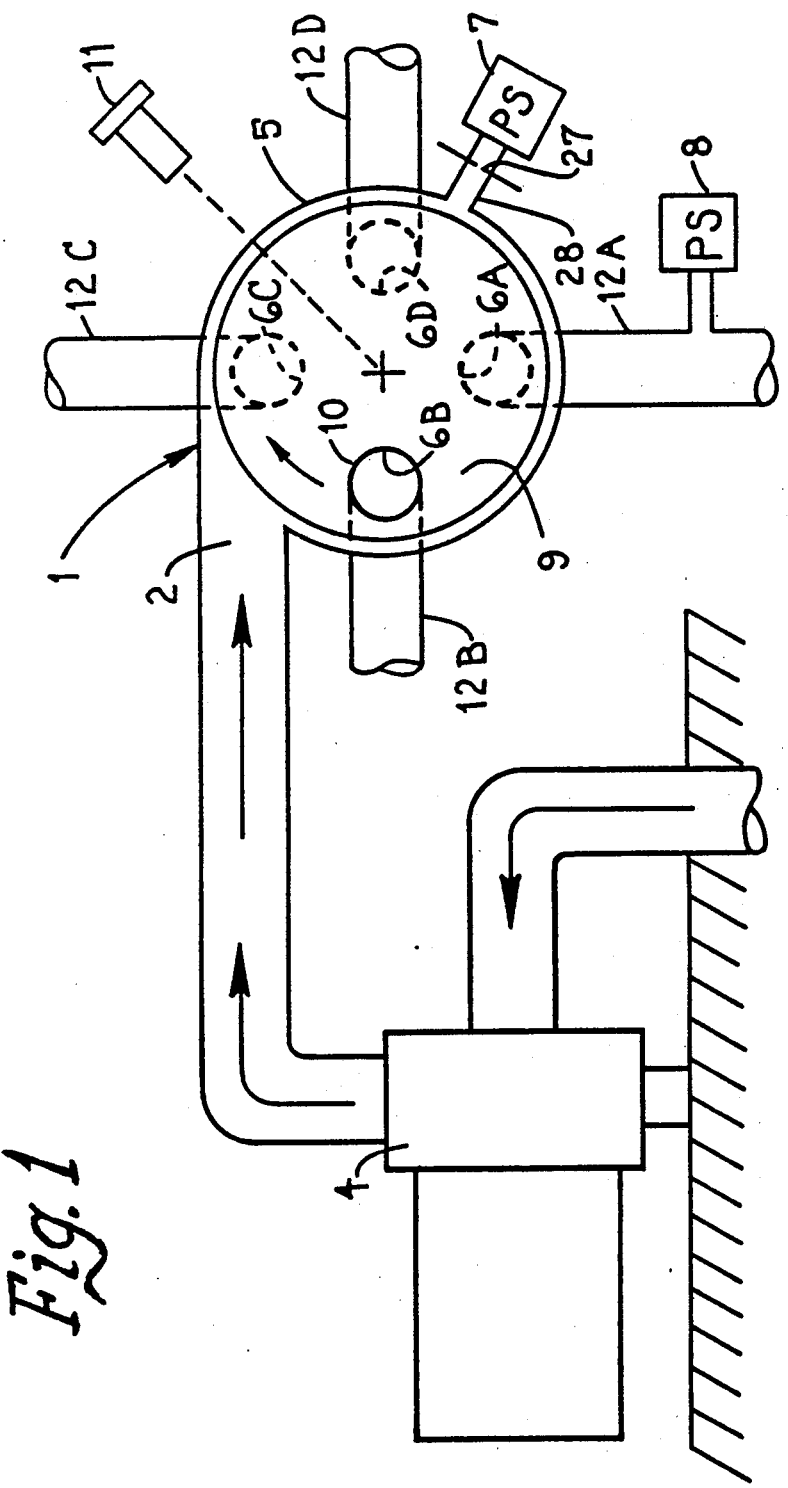
FIG. 1 is a schematic representation of a sequencing distributing valve showing a single water flow inlet with a water source such as a pump; the sequencing distributing valve housing; multiple water flow outlets; a first pressure switch with sensing tap location on the sequencing distributing valve housing; and a second pressure switch with sensing location on a designated outlet.

Referring to FIG. 1, a sequencing distributing valve 1 is shown schematically with a water inlet 2; a water source such as a pump 4; valve housing 5; four valve outlets 6A, 6B, 6C and 6D connected to outlet pipes 12A, 12B, 12C and 12D, respectively; valve housing pressure sensing switch 7; and pressure sensing switch 8 for sensing outlet "one" pressure.

For purposes of this description, a sequencing distributing valve 1 of the type described fully in my U.S. Pat. No. 4,125,124 is shown schematically with a rotating outlet selection disc 9 which has one outlet selection hole 10 and is advanced one valve outlet for each time the flow to the sequencing distributing valve 1 is stopped and then started again. The contents of U.S. Pat. No. 4,125,124 are incorporated herein by reference as though fully set forth.

Thus each time the flow to sequencing distributing valve 1 is turned "ON" and the valve housing 5 is pressurized, the rotating outlet selection disc 9 is advanced to the next outlet (6A–6D) and the flow from the inlet 2 is directed through the outlet selection hole 10 to the outlet which has been aligned with hole 10 of the selection disc 9 by a valve indexing cam 11; said rotation and alignment of an outlet selection disc 9 is well known in the art.

Figure 2:
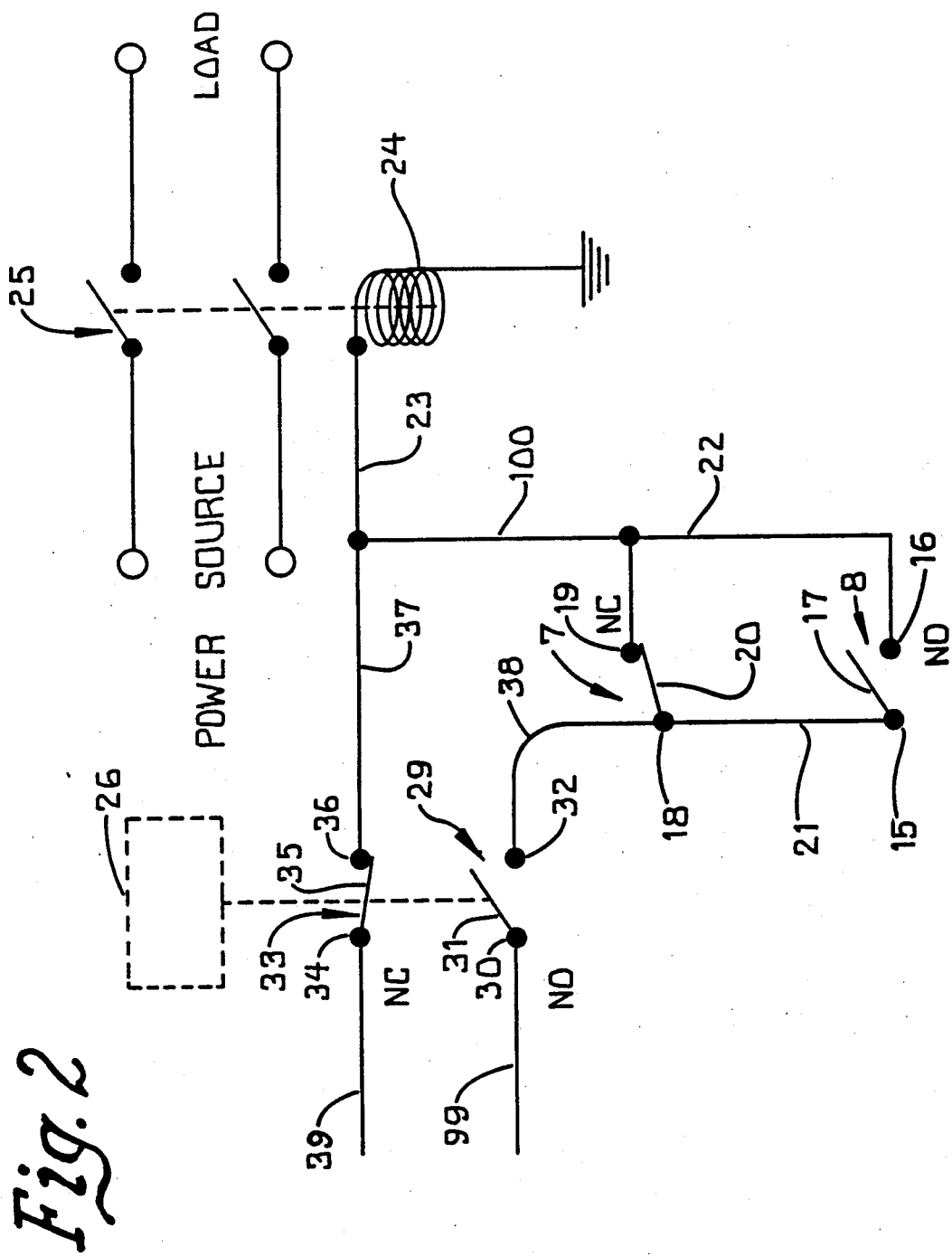
FIG. 2 shows a pressure cycling device to reset the sequencing distributing valve by calling for the valve selection hole of the valving means to be aligned with a desired outlet "one", of a plurality of outlets, in order to be synchronized to a desired "ON" time for outlet "one" of a timing device.

Now referring to FIG. 2, a circuit is shown which can automatically rapidly cycle the flow "ON" and "OFF" to the sequencing distributing valve 1 as a function of when the pressure in the valve housing 5 has risen high enough to sequence the outlet selection disc 9 of sequencing distributing valve 1, by downward movement in cam 11, and fallen off sufficiently to allow the outlet selection disc 9 of sequencing distributing valve 1 to be returned upwardly to an advanced position to be cycled by the next pressure "ON" cycle as sensed by the valve housing pressure sensing switch 7. Also the circuit provides for keeping the water supply "ON" once flow has been sensed by a pressure sensing switch 8 on the desired outlet "one", 6A, of the sequencing distributing valve 1.

Operation of the circuit shown in FIG. 1 is as follows: When it is desired to insure that flow will come out of outlet "one", 6A, of the sequencing distributing valve 1, in order to be in proper sequence with a series of "ON-OFF" subsequent sequential desired outlet "ON" run times, a reset switch 29 is actuated either by a reset signal and relay from an electronic controller 26 or actuated by a mechanical clock time dial having an actuation projection, or arm, such as was previously disclosed in my U.S. Pat. No. 4,146,054. The projection, or arm, has a short engaging surface which actuates reset switch 29 and timing control interrupt switch 33 so that proper sequencing can occur to place the hole 10 of selection disc 9 in a known position. The contents of U.S. Pat. No. 4,146,054 are incorporated herein by reference as though fully set forth.

When reset switch 29 is closed, contact 30 is connected to contact 32 by switch arm 31. A voltage is supplied to normally closed contacts 18 and 19 by switch arm 20 of the housing pressure sensing switch 7 through connecting wire 38 from an appropriate source on connecting wire 99. Also when reset switch 29 is activated, a mechanical linkage to a pump timing control interrupt switch 33 causes contacts 34 and 36 to be opened by its switch arm 35, disabling a normal "ON-OFF" timing control signal on line 39 from a control timer which determines various outlet "ON" times.

Voltage is now supplied from a power source on connecting wire 99 through the now closed contacts 30 and 32 through connecting wire 38 and normally closed contacts 18 and 19 through connecting wire 100 and 23 to pump start relay coil 24. This energizes the pump start relay contacts 25 and the pump 4 begins to flow water to the sequencing distributing valve 1, through inlet 2, causing the pressure of the valve housing 5 to rise to cycle the distributing valve to an outlet, and after a slight (several second) delay as extended by the addition of a bleed orifice 27 (FIG. 1) in a conduit 28 connecting the housing pressure sensing switch 7 to the valve housing 5, the housing pressure sensing switch 7 is then actuated to open contacts 18 and 19.

An electrical path can also be formed from contact 18 through connecting wire 21 to contact 15, normally open switch arm 17, and switch contact 16 of the outlet "one", 6A, to pressure sensing switch 8 through connecting wire 22, 100 and 23 to pump start relay coil 24. However, no connection of the power source to the pump start relay coil 24 is achieved through this path until outlet "one", 6A, of the sequencing distributing valve 1 is selected and pressurized.

Assuming that outlet "one", 6A, was not selected, contacts 18 and 19 of the housing pressure sensing switch 7 are opened by the pressure in the valve housing 5 resulting from the pump 4 being "ON", and pressurizing the valve housing 5, the pump start relay coil 24 is de-energized and the flow from pump 4 stops, causing the pressure in the valve housing 5 to decay. The contacts 18 and 19 of housing pressure sensing switch 7 are not immediately closed due to the delay produced by bleed orifice 27. This insures that the sequencing distributing valve 1 has time to complete its "OFF" sequencing cycle in preparation for its next "ON" sequencing for flowing from the next valve outlet.

When the contacts 18 and 19 of housing pressure sensing switch 7 are again closed, power is again provided to the pump start relay coil 24 through connecting wire 100 and 23 and the valve housing 5 is again pressurized by the pump flow. The just described action of housing pressure sensing switch 7, if outlet "one", 6A, is not selected, again turns off the pump 4 and the sequencing distributing valve 1 is again sequenced (cycled) to the next valve outlet.

This process automatically proceeds at its hydraulic system speed until flow is provided to the outlet "one", 6A, which was selected as the starting outlet. At this time, pressure builds up in the first outlet line 12A and the outlet "one", 6A, pressure sensing switch 8 is actuated to close contacts 15 and 16 providing a continuous source of electric power to the pump start relay coil 24 from power source 99 through the reset switch 29.

The bleed orifice 27 of the housing pressure sensing switch 7 delays the opening of the cycle pressure switch contacts 18 and 19 for each "ON" cycle to allow time for the outlet "one", 6A, pressure sensing switch 8 to be pressurized closing its contacts 15 and 16 prior to the housing pressure sensing switch 7 opening its contacts 18 and 19 which would have again turned off the pump 4.

The pump 4 thus continues to run with flow out of outlet "one", 6A, so long as the reset switch 29 remains closed providing a source of power to the pump start relay coil 24 through the now closed contacts 15 and 16 of the outlet "one", 6A, pressure sensing switch 8.

The delay in the housing pressure sensing switch 7 opening, which is achieved for purposes of this discussion by restricting bleed orifice 27, also provides a delay for the housing pressure sensing switch 7 closing again. These time extensions could also have been provided by an electronic delay circuit.

If a sequence timer with selected start and stopping times is provided for automatic timing of each of the outlet flows of the sequencing distributing valve, the "ON" signal of the reset switch 29 can be coordinated by this timer so that it is closed at the start of the sequence timing and that it is held closed for sufficient time during the outlet "one", 6A, timing to cause the valve to be pressure sequenced to flow out of outlet "one", 6A, before switch 29 is de-energized and the mechanically linked contacts 34 and 36 of its pump timing control interrupt switch 33 are closed again.

If the sequence timer has also energized the first station's "ON" signal as supplied to the pump start relay's circuit of FIG. 2 through wire 39 and contacts 34 and 36 of pump timing control interrupt switch 33 (as previously mentioned) then when the timing control interrupt switch 33 of reset switch 29 is de-energized the pump start relay coil 24 will remain energized through the now closed contacts 34 and 36 from the timing signal power source on wire 39 and connecting wires 37 and 23 for the desired outlet "one", 6A, flow time of the sequence timing circuit. The other outlet "ON" times can then follow with the valve's sequence correctly sequenced to the timer.

Thus timing control interrupt switch 33 which is mechanically linked to reset switch 29 is needed to disconnect control of the pump start relay coil 24, from the sequence timer output on connecting wire 39 in order to allow automatic pressure cycling of the sequencing distributing valve 1 to its desired outlet "one", 6A, after which time the reset circuit function is deactivated by opening reset switch 29 and allowing the pump timing control interrupt switch 33 contacts to close, reestablishing timing control of the outlet flows of the sequencing distributing valve 1.

If the reset switch 29 and timing control interrupt switch 33 are actuated at a time not at the start of the sequence timing, and the outlet selection disc 9 is cycled until outlet "one", 6A, is selected, at which time the cycling stops and reset switch 29 is turned off and timing control interrupt switch 33 is re-engaged placing the hole 10 of disc 9 in a known position, the times selected for the zones (assume four zones) should then be set in line as follows: time for outlet 6B, then outlet 6C, then outlet 6D, and then outlet "one", 6A.

Figure 3:
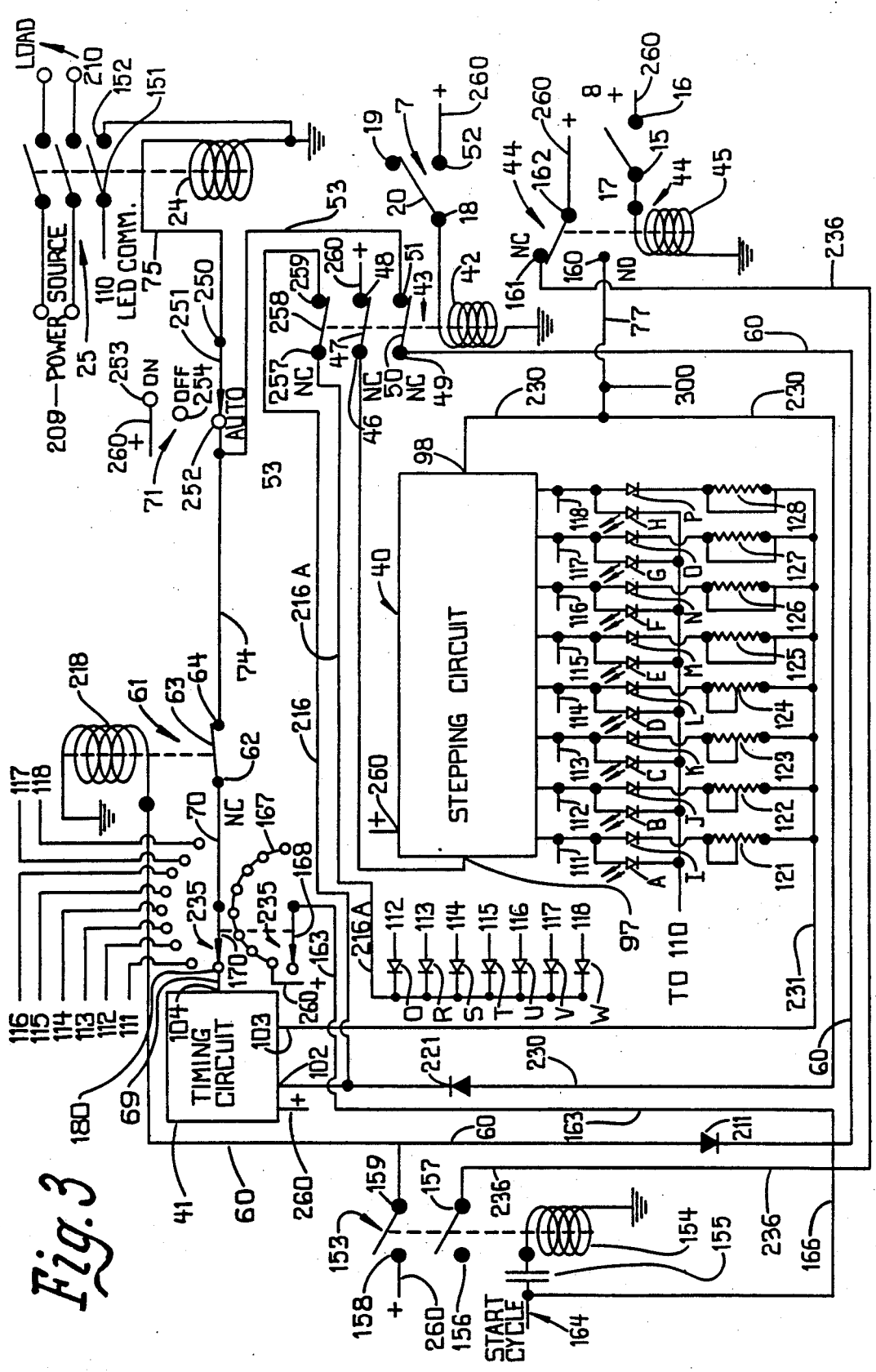
FIG. 3 shows a schematic of a circuit having means for sending out a predetermined number of timed output signals in a desired sequence for operating a sequencing distributing valve and means for sequencing said sequencing distributing valve at the beginning of a timing cycle to properly start outlet "one" and including a manual station selection switch for manually turning "ON" a selected outlet by automatically cycling the sequencing distributing valve to said outlet. The circuit also includes means for using the sequencing distributing valve outlet "one" pressure sensor to reset the circuit's stepping circuit to its first output and further means for using the housing pressure signal of the sequencing distributing valve to step the stepping circuit each time the housing pressure of the sequencing distributing valve indicated that the sequencing distributing valve has cycled.

The circuit of FIG. 3 has been configured to take advantage of the automatic sequencing capability as well as the sequencing position information about the sequencing distributing valve 1 provided by only the two pressure switches 7 and 8 to provide reliable outlet flow timing and display valve position information. Automatic pressure cycling to a manually selected sequencing distributing valve position for flow has also been provided for.

The circuit shown consists of a stepping circuit with eight outputs of the type commercially available on an integrated stepping circuit 40 such as a Motorola MC 14022 B. This commercially available packaged circuit has eight output lines, an up-going pulse clocking input 97 that advances, steps, the "ON" output signal from one of the eight output lines (111 through 118) to the next line each time an up-going pulse is directed to the stepping circuit 40 at input 97. This circuit also has a reset input 98 that at any time it has a positive signal, causes the stepping circuit 40 to be reset back to have its output line one, 111, be positive. Subsequent clocking pulses at input 97 will then step the output to have output line one, 111, "OFF" and output line two, 112, "ON" and so on. The schematic is shown as it would be connected, and timing set for control of a sequencing distributing valve with four outlets, with resistance values set on timing resistors 121, 122, 123 and 124. The other output lines of stepping circuit 40 have their variable timing resistors 125, 126, 127 and 128 set to zero which causes a timing circuit 41 (to be discussed) to have zero output time for these unused outputs of the stepping circuit 40. Any time the stepping circuit 40 is stepped past output line four, 114, there will be no "ON" time for the control circuit since variable timing resistors 125, 126, 127, 128 are set to zero resistance. The timing sequence will remain "OFF" and the flow sequencing of the valve will stop.

The stepping circuit 40 output sequence will be reset to turn on output line one, 111, and start the sequence over by the closing of contacts 15 and 16 of pressure sensing switch 8 when a new start signal is initiated at 164 and the resulting energization of reset relay 44 closes contacts 162 and 160 resetting stepping circuit 40 and also provides a start timing signal to the timing circuit 41 turning "ON" the pump 4.

The other important integrated circuit that is not shown in detail is the timing circuit 41 which provides the outlet flow times for each of the sequencing distributing valve outlets as set with the variable resistance 121 through 128. The Motorola Corporation also manufactures one such integrated timing circuit package as an NC 1455 Timing IC Chip. The timing circuit 41 will provide timing from seconds up to hours by using a variable lower to a higher resistance, such as 10K-3 Meg ohm, in conjunction with a 500 uF capacitor that has been combined with an integrated timing circuit package. Other known variable timing circuits can be used; however, this one was used for simplicity of explanation of the interaction of the controller and sequencing distributing valve.

The timing circuit 41 as represented has two inputs. Input 102 is the start signal for the timing output 104 to go from "OFF" to "ON" and the variable resistance input 103 determines the "ON" time duration of the timing circuits output 104 square wave.

A control voltage source 260 is provided to both integrated circuits 40 and 41.

Controller circuit operation is as follows:

An irrigation cycle start signal is received on line 164 from a time of day clock, or an extra cycle start switch, and is coupled through capacitor 155 to the coil 154 of the "lock-up until reset" relay 153, causing this relay to be energized, closing its contacts 156 and 157, and keeping this relay energized for the present. The energizing of relay 153 also closes its contacts 158 and 159 providing voltage from a voltage source 260 on connecting wire 60 to contacts 49 and 51 of cycle relay 43 through connecting wire 53, contacts 252 and 250 and connecting wire 75 to pump start relay coil 24 energizing the coil and closing the pump start relay contacts 25 starting the pump 4 and supplying water through inlet 2 to the sequencing distributing valve 1.

The valve housing 5 is pressurized and the sequencing distributing valve 1 is sequenced to flow out of one of its outlets. Normally open contacts 52 and 18 of housing pressure sensing switch 7 close upon pressurization which energizes coil 42 of the cycle relay 43 opening its contacts 49 and 51 to remove power from the pump start relay coil 24. Also, contacts 46 and 48 of cycle relay 43 are opened, providing a down-going pulse to the stepping circuit 40 input 97 but no circuit stepping occurs since only an up-going pulse provides stepping.

The stepping circuit 40 is advanced only when the contacts 46 and 48 go closed to provide an up-going stepping pulse. Removal of power to the pump start relay coil 24 by the opening of cycle relay 43, contacts 49 and 51 causes the pump 4 to stop and the pressure in the valve housing 5 to drop off allowing the contacts 18 and 52 of housing pressure sensing switch 7 to again open, de-energizing coil 42 of cycle relay 43 and allowing its contacts 46 and 48 to again close, providing an up-going pulse at input 97 and now stepping the stepping circuit 40 to its next output. Also, the normally closed contacts 49 and 51 of cycle relay 43 again close, startig the pump 4 by energizing connecting wire 53 to pump start relay coil 24 through contacts 252, 250 and connecting wire 75.

However, if the sequencing distributing valve 1 was in the matching sequence to the timing circuit, flow will be directed out of outlet "one", 6A, pressure sensing switch 8 will close normally open contacts 15 and 16, energizing coil 45 of reset relay 44 closing its contacts 162 to 160 and providing a positive reset signal to the reset input 98 of the stepping circuit 40 through connecting wire 77 and connecting wire 230 which in turn causes the output line one, 111, of stepping circuit 40 to be turned "ON". The closing of contacts 162 and 160 also provides a positive start signal to timing circuit 41 through connecting wire 77 and 230 and blocking diode 221, to start input 102 of the timing circuit 41.

The output line one, 111, of stepping circuit 40 has resistance 121 set into it and connected by wire 231 to the timing circuit 41, input 103 for the "ON" time desired for outlet "one", 6A, of the sequencing distributing valve 1 so that the start signal which was also provided to the timing circuit 41 at input 102 by the closure of contacts 162 and 160 causes its output 104 to become positive and provides a signal at the pump start relay coil 24 through connecting wire 69, contact 180, rotary switch wiper arm 170 of the manual outlet selection switch 235, connecting wire 70, contacts 62, 64 and arm 63 of the start cycle reset action allow relay 61, connecting wire 74, contacts 252, 250, and arm 251 of the manually "ON"-"OFF"-"AUTO" selection switch 71 (hereinafter to be discussed) and finally through connecting wire 75 to pump start relay coil 24 to keep the pump running for the time established for outlet "one", 6A, by variable resistor 121 in combination with the timing circuit 41.

The purpose of connecting wire 216 between the wire 230 connected to the starting pulse input 102 of timing circuit 41, contacts 257, 259 and arm 258 of the cycle relay 43, connecting wire 216A and blocking diodes 0 through W, which are connected to the stepping circuits outputs 112 through 118, respectively, and isolate each of the outputs of the stepping circuit 40 from each other, is to provide the timing circuit 41 with a timing start pulse each time a subsequent new stepping circuit output is stepped to after output line one, 111. Output line one, 111, gets its starting pulse only from the closing of the reset relay contacts 160 and 162. The cycle relay 43 contacts 257 and 259 open after the start of each flow cycle and allow the timing circuit 41 to time out and be ready to accept the next starting pulse.

The purpose of blocking diode 221 is to prevent the subsequent timing start signals provided from the other station outputs 112 through 118 of stepping circuit 40 through connecting wire 216 from providing a reset signal back through connecting wire 230 to the stepping circuit 40 reset input 98.

Sequencing of the stepping circuit's output from one to the next is provided for each time the pressure in valve housing 5 drops off causing contacts 52 and 18 of housing pressure sensing switch 7 to open and contacts 46 and 48 of relay 43 to close again providing an up-going pulse to the stepping circuit 40 at its stepping input 97.

The station output line one, 111, from the stepping circuit 40 is not connected to connecting wire 216A. Thus, if an eight outlet sequencing distributing valve is used and all of the eight outputs of the stepping circuit have resistance time set in on all of the variable resistors 121 through 128, the sequencing distributing valve 1 will be operated for eight different run times each of which turns "ON" and holds the pump start relay coil 24 energized for some period of time as determined by the value of the resistance set into variable resistors 121-128, after which the timing circuit 41 output 104 turns off and the pump start relay coil 24 is de-energized causing flow to the sequencing distributing valve 1 to stop and the valve housing pressure switch 7 to de-energize which causes cycle relay 43 to de-energize and its contacts 46 and 48 to close providing the up-going stepping pulse to the input 97 of stepping circuit 40, causing it to step to the next output. A timing start signal is provided to the timing circuit 41 at input 102 from each of the subsequent output lines 112 through 118 of stepping circuit 40 through its diode "O" through "W", respectively, through connecting wires 216A and 216, and contacts 257, 259 and arm 258 of cycle relay 43, as set forth above.

When the stepping circuit 40 is again stepped to its first output line one, 111, which has no start timing signal connection to the timing circuit 41 through connecting wire 216, the timing circuit 41 "ON" signal from output 104 to the pump start relay coil 24 is not started (turned "ON"). As a result, until another start cycle signal is received on line 164, the system stops with the pump 4 and sequencing distributing valve 1 off and stepping circuit 40 output line one, 111, "ON" but no output LED indication light is "ON", such as A through H, because the pump start relay coil 24 is not energized and its LED common 110 contacts 151, 152 are open.

At the start of a new timing cycle the "lock-up until reset" relay 153 is held energized after being pulsed "ON" by the cycle start signal on line 164 being coupled to momentarily energize its coil 154 through coupling capacitor 155 and kept energized by its holding contacts 156 and 157 being closed and supplied with a voltage source through connecting wire 236 to reset relay 44, contacts 162 and 161 (as previously discussed).

While the "lock-up until reset" relay 153 is energized it holds its contacts 158 and 159 closed providing power to the coil 218 of the start of cycle reset action allow relay 61 through connecting wire 60 and maintains a voltage on connecting wire 60 to contacts 49 and 51 of the cycle relay 43, causing the pump 4 to be turned "ON" and then "OFF" as the housing pressure of the sequencing distributing valve rises and falls as previously described.

The purpose of the reset action allow relay 61 is to interrupt the output 104 "ON" signal of the timing circuit to the pump start relay coil 24 by opening its contacts 62 and 64. This allows the pump 4 and sequencing distributing valve 1 to be turned "ON" and "OFF" by the action of the contacts 18 and 52 of housing pressure switch 7 which energizes the cycle relay 43 causing its contacts 49 and 51 to open each time the sequencing distributing valve 1 is pressurized and to be closed each time the sequencing distributing valve housing pressure falls sufficiently to allow the sequencing distributing valve to be cycled the next time pressure is turned back "ON".

As just stated, voltage is supplied from the now closed contacts 158 and 159 of the "lock-up until reset" relay 153 through connecting wire 60 to contacts 49 and 51 of the cycle relay 43 to pump start relay coil 24 through connecting wire 53 and 75. This voltage source re-energizes the pump start relay coil 24 each time contacts 49 and 51 close when the cycle relay 43 is de-energized and causes the sequencing distributing valve 1 to repeatedly cycle "ON" and "OFF" until flow is sensed out of outlet "one", 6A, at which time the contacts 15 and 16 of the outlet "one", 6A, pressure sensing switch 8 are closed energizing the reset relay 44 and opening contacts 162 and 161 which removes voltage from connecting wire 236 to the cycle start "lock-up until reset" relay 153 holding contacts 156 and 157 and the relay is de-energized. This action also closes contact 162 to 160 providing a reset signal to the stepping circuit 40 to insure that its first output line one, 111, is turned "ON" and it is also connected by connecting wire 230 to start timing input 102 of timing circuit 41 through block diode 221 to start the timing circuit 41 thus initiating the output one timing with the sequencing distributing valve 1 correctly flowing out of outlet "one", 6A.

De-energizing the cycle start "lock-up until reset" relay 153 also causes its contacts 159 and 158 to open, removing the voltage from connecting wire 60 to the coil 218 of the start of cycle reset action allow relay 61 and its contacts 62 and 63 then close to complete the circuit between the output of the timing circuit 41 to the pump start relay coil 24 now keeping it on continuously until the timing circuit 41 completes the time for water to flow to output "one" of the sequencing distributing valve 1, then the voltage at its output 104 goes to zero.

When the output 104 of timing circuit 41 "times out" and goes to neutral, and the pump start relay 25 contacts turn off the pump 4, the pressure in the valve housing 5 will drop and contacts 18 and 52 of housing pressure sensing switch 7 will be opened causing relay 43 to de-energize closing contacts 49 and 51 and contacts 46 and 48. There is now no voltage on connecting wire 60 so that the closing of contacts 49 and 51 have no effect.

The closing of the contacts 46 and 48 of cycle relay 43 provide an up-going pulse to the input 97 of stepping circuit 40 and its output is advanced from output line "one", 111, to output line "two", 112, providing a new timing resistance 122 on connecting wire 231 to the timing circuit 41 input 103.

Blocking diodes I through P on the output lines 111 through 118 of stepping circuit 40 to the variable timing resistors 121 through 128 are used to isolate each of the variable resistors commonly connected to connecting wire 231 from each other and the outputs of stepping circuit 40.

A new timing start signal is provided to the timing circuit 41 from the now energized output, line "two", 112, of the stepping circuit 40 through blocking diode 0 and connecting wire 216, now closed contacts 257 and 258 of the cycle relay 43 and connecting wire 216A, to 102 of the timing circuit 41, starting the timing for the second outlet of the sequencing distributing valve 1 and causing output 104 of the timing circuit 41 to again go positive which connects to the pump start relay coil 24 through connecting wire 69, contact 180 and wiper 170 of rotary station selection switch 235, connecting wire 70, contacts 62, 64 and arm 63 of relay 61, connecting wire 74, contacts 252, 250 and arm 251 of the controller mode selector switch 71 and connecting wire 75.

The pump start relay coil 24 is again energized pulling in pump start contact 25 and the pump flow again pressurizes the sequencing distributing valve housing 1 causing the normally open contacts 18 and 52 of the housing pressure sensing switch 7 to be closed by switch arm 20 which again energizes the coil 42 of the cycle relay 43. This again causes the cycle relay 43, contacts 46 and 48 to open with no apparent effect since the stepping circuit is advanced only by up-going pulses as previously described, and causes contacts 49 and 51 to open also with no effect since there is now no voltage on connecting wire 60, and causes contacts 257 and 259 to open which now removes the start pulse from the timing circuit 41, a necessity to allow this circuit to "time out" and be prepared to accept another start timing pulse.

Cycle relay 43 contacts 49 and 51 have no effect during timing "ON"-"OFF" operation since they receive power only when connecting wire 60 is energized.

This timing sequence, pump "ON"-"OFF", and valve changing outlet sequence will be repeated for each of the outputs of the stepping circuit 40 that have an "ON" timing resistance value set in its variable resistor.

In the case shown when the stepping circuit 40 has been cycled to its output line "five", 115, which has no timing resistance 125 set in, there will be no output from timing circuit 41 and the pump start relay 24 will not be turned "ON" again after going "OFF" from running output line "four", 114, and the cycle will stop with the stepping circuit output line "five", 115, energized. No further action will occur until another start cycle input is received.

The light emitting diode (LED) E which is connected to stepping circuit 40 output line "five", 115, is not lit since contacts 151 and 152 are now open when pump start relay coil 24 is de-energized.

If during the "ON" and "OFF" operation of the pump 4, which sequences the sequencing distributing valve 1, should there be up-down pressure surges of sufficient magnitude to cycle the sequencing distributing valve more than one outlet, they will have been sensed by the housing pressure sensing switch 7 whose action in conjunction with the contacts 46 and 48 of cycle relay 43 opening and closing, providing up-going pulses to the stepping circuit 40 at input 97, will advance the output of the stepping circuit 40 to maintain the correct timing and valve position indication for the outlet of the sequencing distributing valve 1 that is actually flowing.

If it were not for the cycle start "lock-up until reset" relay 153 circuit working in conjunction with the start of cycle reset action allow relay 61, the timing cycle might have started with water flowing out an outlet other than the intended one. It avoids running the sequencing distributing valve 1 with incorrect timing on any of the outlets, but it does require the circuit to cycle the sequencing distributing valve 1 at the beginning of the cycle in order to get it re-synchronized if it were out of sequence before going into its outlet "one" timing.

Pressure cyclcing typically requires less than 10 seconds per cycle as flow and system pressures never get a chance to build up more than just a few p.s.i. necessary to cycle the valve and then the pump or water source is immediately signaled to turn off again as the valve is "ON"-"OFF" cycled to its outlet "one" flowing position.

In contrast, a timed pressure cycled valve would need to be kept on, for example, 5 seconds and off for 20 seconds, to ensure that adequate pressure and flow had been achieved at the sequencing distributing valve 1 to sequence it and that the water source and system pressure had then been shut off and system pressure had decayed sufficiently to allow the sequencing valving disc 9 to release and the valve to be advanced in preparation for turning on to the next outlet.

The cycle start "lock-up until reset" relay 153 and "lock out" to reset cycle action allow relay 61 avoids running the sequencing distributing valve 1 with incorrect timing on any of the outlets; however, it does initiate "ON"-"OFF" cycling of the pump and sequencing distributing valve 1 at the beginning of an irrigation cycle which some customers may not understand or like. An acceptable alternative, since once the valve is in sequence it will stay in sequence, is to simply allow the timing cycle to start and run the pump for the normal times; however, should the sequencing distributing valve 1 flow out of its outlet "one", 6A, when another "output" of the stepping circuit 40 is "ON", the outlet "one", 6A, flow sensing pressure switch 8 will cause the reset relay 44 to be energized which will reset the stepping circuit 40 and also send a signal to now correctly run the time for flow out of the outlet "one", 6A, of the sequencing valve 1 and then continue again through the timing sequence for each of the outputs of the stepping circuit 40 that have a desired timing set into their variable resistors 121-128, as previously discussed. The only penalty for this approach being that upon initial operation one to several outlets of the valve may be flowed with incorrect timing before synchronization of the timing circuit to the valve position is achieved.

Thus the controller timing is now correctly sequenced to the sequencing distributing valve 1 for reliable zone outlet flow timing and the controller is correctly indicating which "outlet" of the valve 1 is currently flowing.

If it is not desired to have the sequencing distributing valve automatically cycled to its outlet "one", 6A, before the timed first cycled begins, the cycle start "lock-up until reset" relay 153 and "lock-out" to cycle reset action allow relay 61 may be omitted. The start cycle signal 164 can then be connected through coupling capacitor 155 to point 300 on the reset circuit connecting wire 77 instead of to coil 154. This will then provide a reset signal to input 98 of the stepping circuit 40 on connecting wire 230 to reset it to output one, 111, and a timing start pulse to the timing circuit 41 at 102 on connecting wire 230 to start the cycle timing intended for the sequencing distributing valve to be flowing out of its outlet "one", 6A. As the timing sequence "times out" and goes "OFF" and contacts 46 and 48 of cycle relay 43 go closed, stepping circuit 40 is advanced to turn on its output line "two", 112, providing a start timing signal through isolation diode O on connecting wire 216, through now closed contacts 257 and 259 and connecting wire 216A to wire 230 to start timing input 102, and a new variable resistor time value on variable resistor 122 for the next timed sequencing distributing valve operation intended for flowing out of its outlet "two", 6B. The valve is advanced to flow from its next outlet.

When the sequencing distributing valve 1 does flow out of its first outlet "one", 6A, the pressure sensing switch 8 will be actuated, energizing reset relay 44 and closing normally open contacts 162 and 160 thereby resetting the stepping chip 40, through connecting wire 77 and 230 to reset input 98, to its output line "one", 111, and the cycle timing is restarted now by the signal on connecting wire 230 to the timing circuit 41 start timing input 102 through blocking diode 221 with the timing and indicating circuits now properly in sequence with the sequencing distributing valve and correctly indicating which outlet of the sequencing distributing valve 1 is flowing.

These have always been the primary objections to a sequencing distributing valve's application for irrigation systems; the lack of reliable zone timing due to the prior lack of a simple reliable synchronization means between the valve and the timing device and a reliable indication of which output is on.

In addition to overcoming these objections with simple, reliable means, the pressure cycle switch and stepping circuit 40 can be used to allow the user to rapidly cycle to a desired selected outlet and then have the system flow from that outlet for the desired time before advancing through the balance of the irrigation cycle or being turned off.

A desired zone can be manually selected and run for any desired time by only the addition of a rotary outlet selection switch 235 connected as shown in FIG. 3 with the rotary contact 180 and rotary switch wiper arm 170, interrupting the connection between the output 104 of the timing circuit and the pump start relay coil 24, substituting a connection to the selected output line 111-118 of stepping circuit 40 representing a desired outlet of the sequencing distributing valve 1 to be run.

A second rotary switch wiper arm 168 is moved by the same assembly 235 and used to connect a source of voltage 260 on eight connected contacts 167 for the eight positions of the rotary outlet selection switch 235 through wire 163 and connecting wire 60 to provide contacts 49 and 51 of cycle relay 43 with a source of voltage 260 for directing to the pump start relay coil 24. This causes the pump 4 to be pressure cycled "ON" and "OFF" by housing pressure sensing switch 7 as previously described, until the output line 111–118 of the stepping circuit 40 which was manually selected by the positioning of the wiper arm 170 of rotary switch 235 is stepped "ON". At this time a continuous source of voltage is provided by the selected output line of stepping circuit 40 to hold the pump start relay coil 24 "ON" through connecting wire 70, contacts 62, 64, and arm 63 connecting wire 74, contacts 252, 250 and arm 251, and connecting wire 75 to relay coil 24. The desired outlet of the sequencing distributing valve 1 is now running.

Just as for the start of a new cycle an automatic reset at start of cycle pulse can be provided from rotary switch wiper arm 168 and connected contacts 167 through connecting wire 163 to connecting wire 166 to coupling capacitor 155 to turn "ON" the cycle start "lock-up until reset" relay 153. This relay, in conjunction with start of cycle reset action allow relay 61, as described before, will open contacts 62 and 64 of relay 61 to isolate the rotary outlet selection switch 235, rotary switch wiper arm 170 and selected output line 111–118 of the stepping circuit 40 from the pump start relay coil 24 until outlet "one", 6A, of sequencing distributing valve 1 is flowing. At this time the outlet "one" pressure switch 8 will be closed to energize reset relay 44 and move its contact 162 to provide a stepping circuit 40 reset signal at 98 and cause the stepping circuit 40 output to be reset to have output 111 energized and also open its contact 161 to cause the cycle start "lock-up until reset" relay 153 to drop out, de-energizing, which then allows relay 61 to de-energize and its contacts 62 and 64 to close. This completes the circuit again for rotary outlet selection switch 235 rotary wiper contact 170 to the pump start relay from the selected output 111 through 118 of stepping circuit 40, and allowing the pressure cycle sequencing of the sequencing distributing valve 1 to continue as caused by voltage remaining on connecting wire 60 as provided by rotary switch 235 wiper contact 168 and connecting wires 163 and 60 to contacts 49 and 51 of cycle relay 43. Contacts 49 and 51 of the cycle relay 43 are being opened and closed by the sequencing distributing valve's housing pressure sensing switch 7 as the valve housing is being pressurized by the pump being ON and then having its pressure drop off when the pump is turned OFF again by the opening of contacts 49 and 51 due to the action of the housing pressure switch 7 on cycle relay 43 and pump start relay coil 24 and contacts 25.

The action of contacts 46 and 48 closing and opening with each pressure cycle in the sequencing distributing valve 1 then advances the stepping circuit outputs 111–118 until it energizes the same selection switch 235 contact 111–118 that the wiper arm 170 has selected and voltage is continuously provided to the pump start relay coil 24 through connecting wire 70, contacts 60 and 64, connecting wire 74, contacts 250 and 252 and connecting wire 75, keeping the pump 4 running and stopping the pressure cycling until the rotary selection switch 235 is again moved to another selection or moved back to its 180 normal timing position.

Blocking diode 211 is placed in connecting wire 60 to isolate the manual selection switches 235 "ON" voltage signal on connecting wire 163 to connecting wire 60 from also keeping start of cycle reset action allow relay 61 energized.

If the auto-reset cycling of the sequencing distributing valve 1 to flow from outlet "one", 6A, is not desired at the beginning of the manual outlet selection switch action connecting wire 166 can be disconnected from connecting wires 163 and 60.

A controller mode selection switch 71 is provided to allow turning "ON" the pump 4 manually by moving its contact 250 wiper arm 251 into connection with its contact 253 for manually "ON" or to contact 254, the contact "OFF" position. It should be noted that the cycling relay 43 stepping contacts 46–48 are still connected to the stepping circuit 40 up-going stepping pulse input 97 causing it to be stepped to the next output each time they go closed as a result of the sequencing distributing valve housing pressure switch 7 contacts going open de-energizing cycle relay 43, thus maintaining a proper indication of valve flowing position even when the unit is being turned "ON" and "OFF" manually with the mode switch. Also, the outlet one pressure sense reset relay 44 contacts 162–160 are still connected to the stepping circuit 40 reset input 98 to insure properly resetting and position indication of the stepping circuit 40 and its indicator LED "A" through "H".

The exact electrical circuitry to achieve these results are of less importance than the concepts here feasibly disclosed since when this circuitry is executed with the outputs from a computer microprocessor controller they can be handled with ease in a number of different ways.

Figure 4:
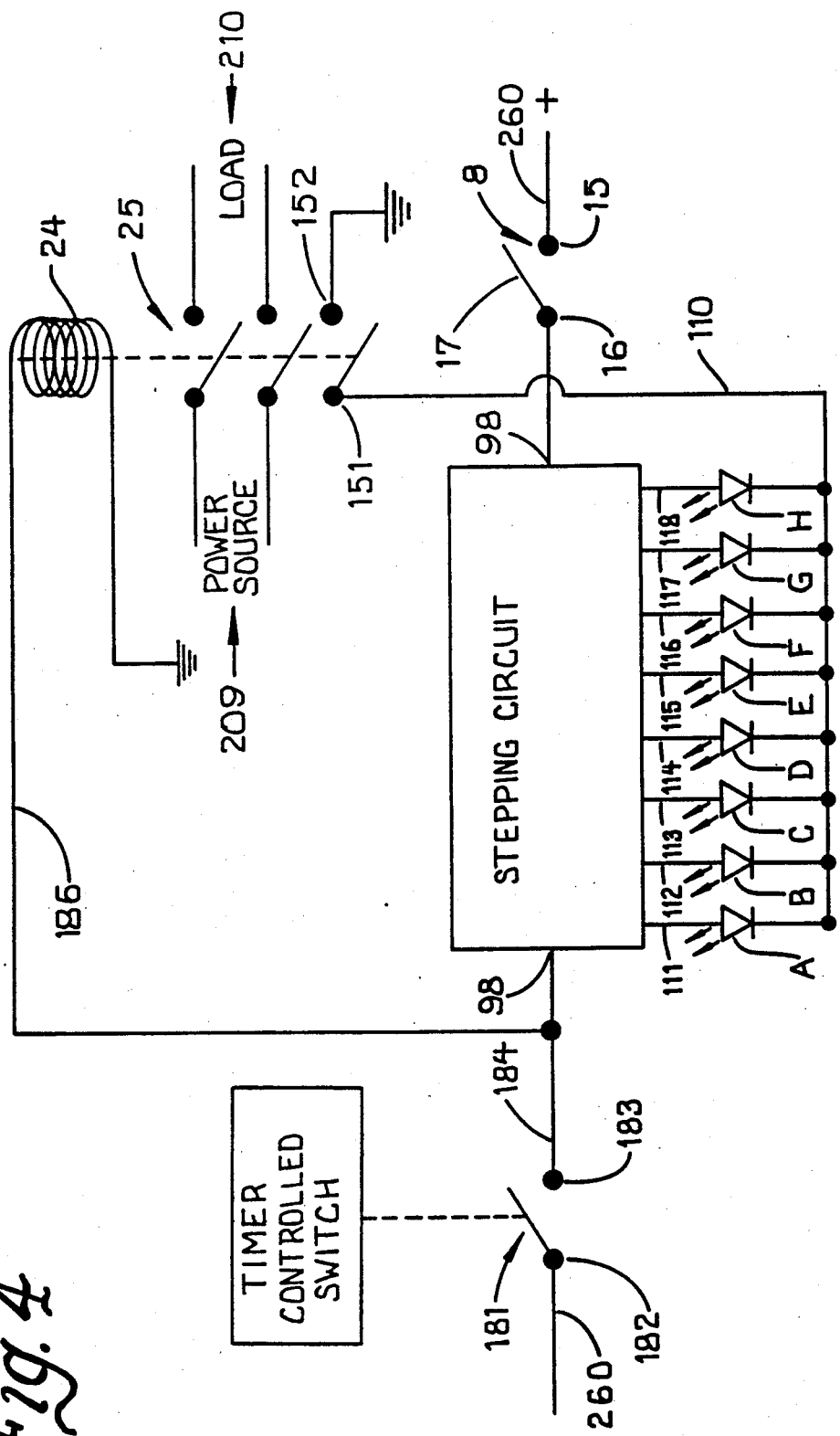
FIG. 4 shows a circuit for resetting position indication of the sequencing distributing valve and timing circuit to that of the sequencing distributing valve's flowing outlet.

A simplified circuit is shown in FIG. 4 where the output of the stepping circuit 40 and indicating circuit is reset at output 111 when outlet "one", 6A, of sequencing distributing valve 1 is flowing. Any time the contacts 15 and 16 of pressure switch 8 are connected by arm 17 by an operating pressure acting in the sequencing distributing valve outlet "one", 6A, indicating flow in that outlet, reset occurs. The reset of the stepping circuit 40 to its output one, 111, when outlet "one", 6A, of the sequencing distributing valve 1 is flowing, synchronizes the stepping and indicating circuit to the sequencing distributing valve 1 at least once during each valve flow sequence to insure proper indication of which of the sequencing distributing valve outlets is flowing.

The pump start relay coil 24 is energized by voltage on connecting wire 186 from voltage source 260 whenever timer contacts 182 and 183 are connected by arm 181. The pump start relay coil 24, in addition to causing the pump start relay power contacts 25 to close, closes contacts 151 and 152 to provide a common ground to illuminate the indicating LED A-H for the stepping circuit output that has a voltage output and indicates which of the sequencing distributing valve outlets is flowing.

This circuit does rely on the fact that the sequencing distributing valve does not skip due to hydraulic pressure or water supply pump surges once the valve and stepping circuit reset action has occurred until the next time the valve's outlet "one" pressure reset pressure switch 8 is activated. The output of stepping circuit 40 is advanced each time the switch 181 connects its contacts 182 and 183 to provide an up-going pulse to the stepping circuit 40 at stepping input 97. Switch 181 can be operated by a timer clock, any other well known timer means, or manually.

Figure 5:
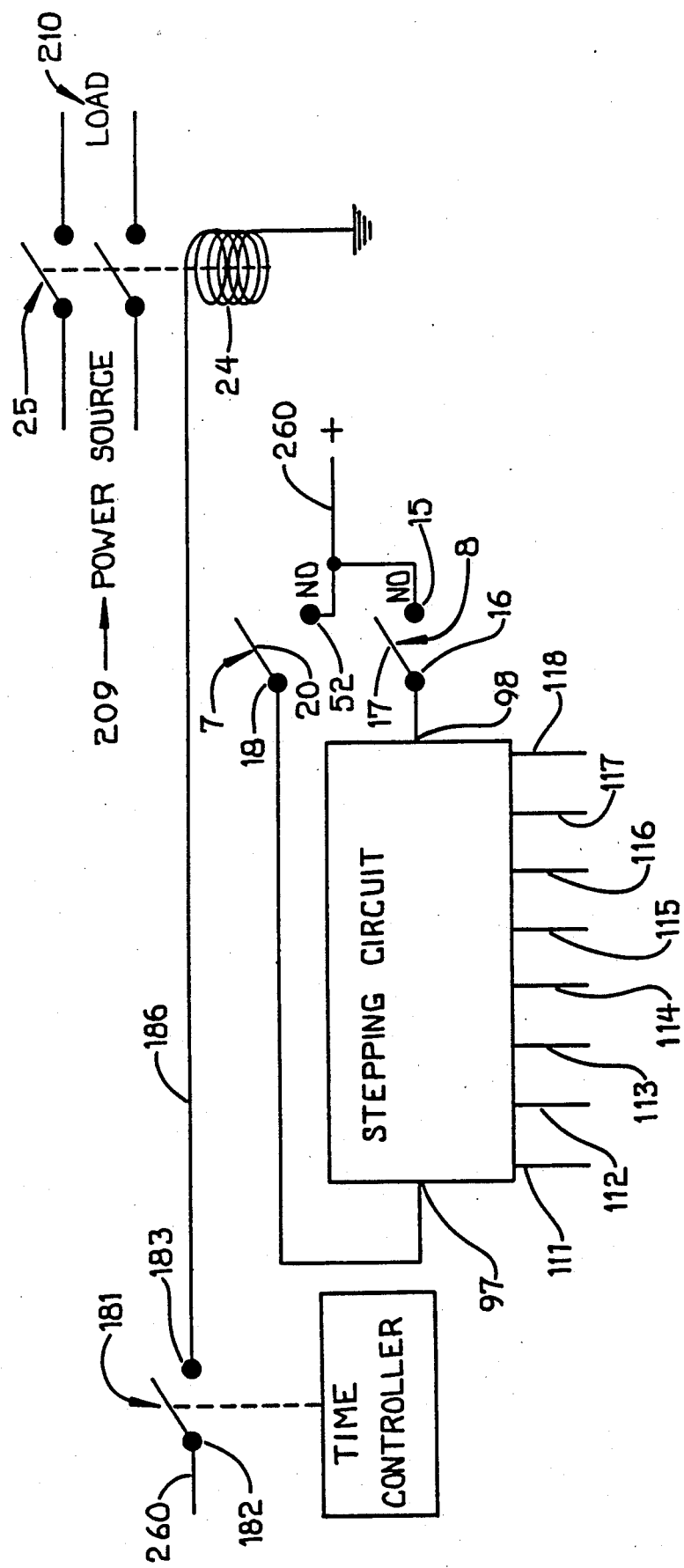
FIG. 5 shows a valve flow position tracking circuit with circuit reset by outlet "one" of the sequencing distributing valve.

A slightly more complicated circuit is shown in FIG. 5 which now adds the housing pressure sensing switch 7 input for stepping the stepping circuit 40 instead of the stepping circuit being advanced each time the timer switch 181 contacts are closed. This insures that the output of stepping circuit 40 advances each time the sequencing distributing valve is sequenced by pressure conditions in the valve which causes contacts 18 and 52 of housing pressure switch 7 to close providing an up-going pulse at the stepping circuit 40 input 97 which advances its output to the next output. Just as in the circuit shown in FIG. 4, the stepping circuit 40 is reset to its output one, 111, each time pressure is sensed in the sequencing distributing valve's outlet "one", 6A, by reset pressure switch 8 and the closure of its contacts 15 and 16 and voltage being applied to the stepping circuit reset input 98.

The addition of the housing pressure switch insures a reliable position indication throughout the sequencing distributing valve 1 cycle to indicate which outlet of the sequencing distributing valve 1 is flowing.

Figure 6:
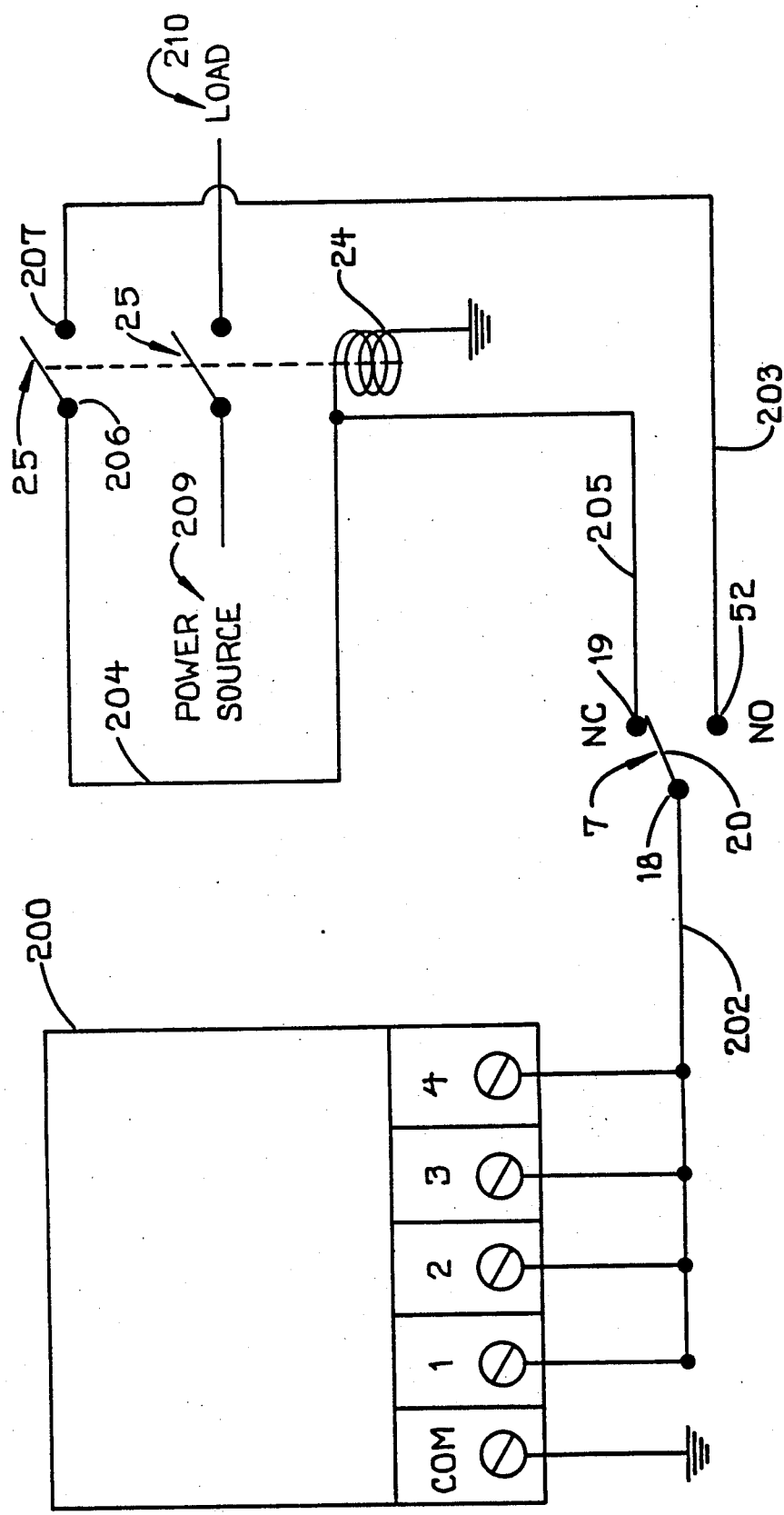
FIG. 6 shows a pressure cycle delay control circuit for control of the sequencing distributing valve.

The circuit shown in FIG. 6 uses the housing pressure sensing switch 7 of the sequencing distributing valve 1 to provide the necessary hydraulic time delay to insure that the pressure in the sequencing distributing valve 1 has fallen sufficiently low to allow it to cycle to the next outlet before the power can again be turned "ON". The pump start relay coil 24 once turned "OFF" cannot be turned "ON" again prior to the pressure in the sequencing distributing valve 1 having fallen off sufficiently to allow the valve housing pressure sensing switch 7 to again close its contacts 18 and 19 providing the path to again energize the pump start relay coil 24.

In the circuit shown, this is accomplished by using the housing pressure switch 7 normally closed contacts 18 and 19 to provide a direct electrical path for turning "ON" the water source and the normally open contact as an electrical path for keeping it "ON" through a pump start relay contact whose closure does not restore itself closed again if it should even momentarily go open until the original normally closed contact of the pressure switch again energizes the pump start relay and again closes contacts 206 and 207. This can be accomplished with the addition of only a double pole single throw output relay 25 in conjunction with the housing pressure sensing switch 7 contacts.

Many conventional individual solenoid valve controls, shown as 200 with its four individual output signals although not providing any time delay between zone stations, timing which is necessary to allow a pressure or flow sequenced distributing valve to be cycled from one outlet to the next, does turn "OFF" each of its outputs completely before turning on the next output which in most cases would be sufficient without additional delay circuitry not shown to allow the pump start relay coil 24 of the FIG. 6 circuit to de-energize due to the momentary loss of power from connecting wire 202 through contacts 18 and 52 and connecting wire 203 contact 206, 207 and connecting wire 204 to relay coil 24.

Thus until the pressure in the valve housing has again dropped down sufficiently to allow the sequencing distributing valve housing pressure switch 7 to again close its pressure "OFF" contacts (normally closed) 18 and 19 the pump start relay coil 24 cannot again be energized since there is now no electrical path to the pump start relay coil 24. When contacts 18 and 19 again close due to the pressure being down in the sequencing distributing valve housing, the pump start relay coil 24 can again be energized by voltage on connecting wire 202 from the controller 200. Energizing the pump start relay contacts 25 causes the valve pressure to again rise causing the housing pressure sensing switch 7 low pressure contacts 18 and 19 to again open, but closes its contacts 18 and 52 providing a continuing electrical path from the controller 200 output on connecting wire 202 through the now closed high pressure contacts 18 and 52 connecting wire 203 and the now closed holding contacts 206 and 207 and connecting wire 204 to the relay coil 24. The pump start relay coil 24 can now remain energized so long as the controller 200 output voltage remains continuously "ON" on connecting wire 202.

This concept (FIG. 6 circuit) could be added to the manually "ON" switch position 70 of mode selection switch 71 of FIG. 3 by just the addition of another set of contacts on the cycle relay 43 and the pump start relay at 25.

We have thus tried to overview with representative electrical circuits the features provided for a sequencing distributing valve when provided with a housing pressure sensing switch and an outlet "one" pressure sensing switch.

Just the application of one or both of these sequencing distributing vavle pressure sensors in combination with the simple circuits disclosed gives the sequencing distributing valve all of the features of an individual solenoid valve controlled irrigation system. With its already accepted advantage of ease of installation, simplicity of after market service and low parts costs, should allow the sequencing distributing valve to assume its rightful place in the world irrigation control systems market.

The suggested pressue switches may be housed in the controller and only have tubing connecting the valve housing tap and outlet "one" pressure tap to the controller.

While the principles of the invention have now been made clear in an illustrative embodiment, it will become obvious to those skilled in the art that many modifications in arrangement are possible without departing from those principles. The appended claims are, therefore, intended to cover and embrace any such modifications, within the limits of the true spirit and scope of the invention.

I claim:

1. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, sensing means sensing each time said valve member is actuated for cycling said means for directing a fluid under pressure to said valve member to position said valve member to direct a fluid under pressure to a preselected outlet.

2. A combination as set forth in claim 1 wherein said sensing means includes a pressure switch responsive to the pressure directed to actuate said valve member for cycling said means for directing a fluid under pressure to said valve member.

3. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, pressure responsive means for cycling said means for directing a fluid under pressure to said valve member to position said valve member to direct a fluid under pressure to a preselected outlet, said pressure responsive means including a pressure switch responsive to the pressure directed to actuate said valve member for cycling said means for directing a fluid under pressure to said valve member, said pressure responsive means including a second pressure switch for stopping the cycling of said valve member when it directs a fluid under pressure to a preselected outlet.

4. A combination as set forth in claim 3 wherein said second pressure responsive switch is responsive to the pressure of the flow in a preselected outlet, means for starting a timing means for sending out a predetermined number of timed output flow signals in a desired sequence to be matched to the desired sequence of flow to said outlets to control the "ON" time of the means for directing a fluid under pressure to said valve member when said second pressure responsive switch has stopped the cycling of said valve member to direct a fluid under pressure to a preselected outlet.

5. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, a timing means for sending out a predetermined number of timed output flow signals in a desired sequence to be matched to the desired sequence of flow to said outlets to control the "ON" time of the means for directing a fluid under pressure to said valve member, pressure responsive means responsive to the pressure of the flow in a preselected outlet for starting said timing means.

6. In combination, a valving device having a housing with a plurality of outlets, said valving device having a valve member in said housing responsive to a fluid under pressure in said housing for directing a fluid to one of said outlets in a desired sequence each time a fluid under pressure is directed to acutuate said valve member, means for directing a fluid under pressure to said valve member for operating said valve member, a timing means for sending out a predetermined number of timed output flow signals in a desired sequence to be matched to the desired sequence of flow to said outlets to control the "ON" time of the means for directing a fluid under pressure to said valve member, pressure responsive means responsive to the pressure of the flow in a preselected outlet for resetting said timing means to have its desired sequence matched to the desired sequence of flow to said outlets.

7. In combination, a valving device having a housing with a plurality of outlets, said valving device having a valve member in said housing responsive to a fluid under pressure in said housing for directing a fluid to one of said outlets in a desired sequence each time a fluid under pressure is directed to acutuate said valve member, means for directing a fluid under pressure to said valve member for operating said valve member, an indicating means for indicating which outlet of the valve is flowing, a pressure responsive means responsive to the pressure of the flow in a preselected outlet for automatically resetting said indicating means to be matched to the valve outlet so that said indicating means indicates the proper valve outlet which is flowing.

8. In combination, a valving device having a housing with a plurality of outlets, said valving device having a valve member in said housing responsive to a fluid under pressure in said housing for directing a fluid to one of said outlets in a desired sequence each time a fluid under pressure is directed to acutuate said valve member, means for directing a fluid under pressure to said valve member for operating said valve member, an indicating means for providing a number of indicating signals in a desired sequence to be matched to the desired sequence of flow of said outlets, a pressure responsive means responsive to the pressure of the flow in a preselected outlet for automatically resetting said indicating means to have its desired sequence of signals matched to the sequence of flow from said outlets.

9. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, an indicating means for providing a number of indicating signals in a desired sequence to be matched to the desired sequence of flow of said outlets, a pressure responsive means responsive to the pressure of the flow in a preselected outlet for resetting said indicating means to have its desired sequence of signals matched to the sequence of flow from said outlets, a second pressure responsive means responsive to the pressure actuating said valve member for advancing said indicating means in its sequence to match the sequence of outlet flow.

10. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, an indicating means for providing a number of indicating signals in a desired sequence to be matched to the desired sequence of flow of said outlets, a pressure responsive means responsive to the pressure actuating said valve member for advancing said indicating means in its sequence to match the sequence of outlet flow.

11. In combination, a valving device having a housing with a plurality of outlets, said valving device having a valve member in said housing responsive to a fluid under pressure in said housing for directing a fluid flow to one of said outlets in a desired sequence each time a fluid under pressure is directed to actuate said valve member, means for directing a fluid under pressure to said valve member for operating said valve member, a timing means for sending out a predetermined number of timed output flow signals in a desired sequence to be matched to the desired sequence of flow to said outlets to control the "ON" time of the means for directing a fluid under pressure to said valve member, pressure responsive means responsive to the pressure directed to actuate said valve member to advance said timing sequence of said timing means for each actuation of said valve member.

12. In combination, a valving device having a housing with a plurality of outlets, said valving device having a valve member in said housing responsive to a fluid under pressure in said housing for directing a fluid flow to one of said outlets in a desired sequence each time a fluid under pressure is directed to actuate said valve member, means for directing a fluid under pressure to said valve member for operating said valve member, a timing means for sending out a predetermined number of timed output flow signals in a desired sequence to be matched to the desired sequence of flow to said outlets to control the "ON" time of the means for directing a fluid under pressure to said valve member, pressure responsive means responsive to the pressure directed to actuate said valve member to advance said timing sequence for each actuation of said valve member, a second pressure responsive means responsive to the pressure in a selected outlet to synchronize the desired sequence of said timing means to match the desired sequence of fluid flow to said outlets.

13. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, a timing means for sending out a predetermined number of timed output flow signals in a desired sequence to be matched to the desired sequence of flow to said outlets to control the "ON" time of the means for directing a fluid under pressure to said valve member, pressure responsive means responsive to the pressure in a selected outlet to synchronize the desired sequence of said timing means to match the desired sequence of fluid flow to said outlets.

14. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, pressure responsive means for cycling said means for directing a fluid under pressure to said valve member to position said valve member to direct a fluid under pressure to a preselected outlet, said means for directing a fluid under pressure to said valve member includes an electrical source for operating said directing means, an electrical circuit for connecting said electrical source to said directing means to direct fluid under pressure therefrom, said electrical circuit including a normally closed pressure responsive switch, said pressure responsive switch being opened by fluid under pressure directed to said valve member by said directing means thereby disconnecting said directing means from said electrical source and stopping it thereby allowing said normally closed pressure switch to become closed starting said directing means again, means for continuously connecting said electrical source to said directing means when a fluid under pressure is directed to a preselected outlet.

15. A combination as set forth in claim 14 wherein said means for directing a fluid under pressure to said valve member includes a pump.

16. In combination, a valving device having a housing with a plurality of outlets, said valve device having a valve member in said housing for distributing fluid in said housing under pressure to each of said outlets in a desired sequence, means for directing a fluid under pressure to said housing for actuating said valve member, pressure responsive means sensing the fluid pressure actuating said valve member for cycling said means for directing a fluid under pressure to said housing each time sufficient pressure has been sensed to actuate said valving member, means for stopping said valve member to provide flow at a desired outlet.

17. In combination, a valving device having a housing with a plurality of outlets, said valving device having a valve member in said housing for distributing fluid in said housing under pressure to each of said outlets in a desired sequence, means for directing a fluid under pressure to said housing for actuating said valve member, pressure responsive means sensing the fluid pressure actuating said valve member for rapidly cycling said valve member through said outlets in a desired sequence, means for stopping said valve member to provide flow at a desired outlet, said means for stopping said valve member to provide flow at a desired outlet includes pressure responsive means sensing the pressure in said desired outlet.

18. In combination, a valving device having a housing with a plurality of outlets, said valving device having a valve member in said housing for distributing fluid in said housing under pressure to each of said outlets in a desired sequence, means for directing a fluid under pressure to said housing for actuating said valve member, means for rapidly cycling said valve member through said outlets in a desired sequence, means for stopping said valve member to provide flow at a desired outlet, said means for stopping said valve member to provide flow at a desired outlet includes pressure responsive means sensing the pressure in said desired outlet.

19. In combination, a valving device having a housing with a plurality of outlets, said valving device having a valve member in said housing responsive to a fluid under pressure in said housing for directing a fluid to one of said outlets in a desired sequence each time a fluid under pressure is directed to actuate said valve member, means for directing a fluid under pressure to said valve member for operating said valve member, pressure responsive means sensitive to the pressure actuating said valve member for preventing the redirection of fluid under pressure to the valve member until the pressure on said valve member has been reduced sufficiently to allow the valve member to be suquenced to its next outlet.

20. In combination, a valving device having a housing with a plurality of outlets, said valving device having a valve member distributing flow to said outlets in a desired sequence, a timing means for sending out a predetermined number of timed output flow signals in a desired sequence to be matched to the desired sequence of flow to said outlets, pressure responsive means for placing said valve member in a position to direct flow through a selected outlet in said sequence, means for automatically placing the timing means in a position to send out the timed output flow signal for the selected outlet thereby synchronizing said valving device and timing means.

21. In combination, a valving device having a housing with a plurality of outlets, said valving device having a valve member distributing flow to said outlets in a desired sequence, a timing means for sending out a predetermined number of timed output flow signals in a desired sequence to be matched to the desired sequence of flow to said outlets, means for placing said valve member in a position to direct flow through a selected outlet in said sequence, pressure responsive means for placing the timing means in a position to send out the timed output flow signal for the selected outlet thereby synchronizing said valving device and timing means.

22. In combination, a valving device having a housing with a plurality of outlets, said valving device having a valve member distributing flow to said outlets in a desired sequence, a timing means for sending out a predetermined number of timed output flow signals in a desired sequence to be matched to the desired sequence of flow to said outlets, pressure responsive means for placing said valve member in a position to direct flow through a selected outlet in said sequence, means for placing the timing means in a position to send out the timed output flow signal for the selected outlet thereby synchronizing said valving device and timing means, said pressure responsive means senses an operating pressure for actuating said valve member, said means for placing the timing means in a position to send out the timed output flow signal for the selected outlet including a second pressure sensing means for sensing an operating pressure in a selected outlet.

23. In combination in an irrigation system, means for directing a plurality of flows to selected areas in a desired sequence, timing means for timing the length of flow of each plurality of flows in a desired sequence, means for automatically synchronizing said desired sequence of a plurality of flows with said desired sequence of length of flows when they become unsynchronized, said synchronizing means having means for placing a flow to a specific selected area and starting the desired sequence of the plurality of flows, said synchronizing means having means for placing the timing means at the length of time of flow for said specific selected area and starting the desired sequence of the timing of the length of each plurality of flows.

24. A combination as set forth in claim 23 wherein said means for synchronizing has pressure responsive means responsive to the pressure of the flow in a specific selected area.

25. In combination in an irrigation system, means for directing a plurality of flows to selected areas in a desired sequence, timing means for timing the length of flow of each plurality of flows in a desired sequence, means for automatically synchronizing said desired sequence of a plurality of flows with said desired sequence of length of flows when they become unsynchronized, said synchronizing means having means for placing the timing means at the length of time of flow for a specific selected area when flow is being directed to a specific selected area.

26. A combination as set forth in claim 25 wherein said means for placing the timing means at the length of time of flow for a specific selected area when flow is being directed to a specific selected area also starting the desired sequence of the timing of the length of each plurality of flows for the desired sequence of selected areas.

27. In combination, a controller for operating a valving device, said valving device having a housing with a plurality oif outlets, said valving device having a valve member in said housing responsive to a fluid under pressure in said housing for directing a fluid to one of said outlets in a desired sequence each time a fluid under pressure is directed to acutate said valve member, means for directing a fluid under pressure to said valve member for operating said valve member, said controller having means for cycling said means for directing a fluid under pressure to said valve member to position said valve member to direct a fluid under pressure to said outlets in a desired sequence, said controller having manually operated means for selecting a desired outlet to receive a flow from said means for directing a fluid under pressure to said housing, said manual means starting said means for cycling said means for directing a fluid under pressure to said valve member, said controller also having a circuit means which keeps track of the "ON-OFF" cycling of the valve member to identify which outlet is flowing, said controller having means for stopping said cycling when said circuit means indicates that the output selected by said manual means has been reached.

28. A combination as set forth in claim 27 wherein said cycling means has pressure responsive means for sensing the pressure directed to said valve member for starting and stopping the means for directing a fluid under pressure to said valve member.

29. A combination as set forth in claim 27 including means for initiating cycling to position the valve member to its first outlet and resetting the circuit means prior to the beginning of the cycling to position the valve flow to the manually selected outlet.

30. A combination as set forth in claim 29 wherein said means for pre-positioning said sequencing valve to flow from its first outlet includes pressure responsive means to sense pressure in the preselected outlet.

31. A combination as set forth in claim 27 wherein said circuit means includes pressure responsive means which is responsive to the pressure actuating said valve member.

32. A combination as set forth in claim 27 wherein said cycling means has pressure responsive means which is responsive to the pressure of the flow in a preselected outlet to place the circuit means into synchronization with the sequence of said valving devive.

* * * * *